(12) United States Patent
Kobayashi et al.

(10) Patent No.: US 10,718,420 B2
(45) Date of Patent: Jul. 21, 2020

(54) WAVE GENERATOR AND STRAIN WAVE GEARING

(71) Applicant: Harmonic Drive Systems Inc., Shinagawa-ku, Tokyo (JP)

(72) Inventors: Masaru Kobayashi, Azumino (JP); Tatsuro Hoshina, Azumino (JP)

(73) Assignee: HARMONIC DRIVE SYSTEMS INC., Shinagawa-Ku, Tokyo (JP)

(*) Notice: Subject to any disclaimer, the term of this patent is extended or adjusted under 35 U.S.C. 154(b) by 537 days.

(21) Appl. No.: 15/541,390

(22) PCT Filed: Jan. 8, 2015

(86) PCT No.: PCT/JP2015/050359
§ 371 (c)(1),
(2) Date: Jul. 3, 2017

(87) PCT Pub. No.: WO2016/110978
PCT Pub. Date: Jul. 14, 2016

(65) Prior Publication Data
US 2018/0023678 A1    Jan. 25, 2018

(51) Int. Cl.
*F16H 1/32* (2006.01)
*F16H 49/00* (2006.01)
(Continued)

(52) U.S. Cl.
CPC ......... *F16H 49/001* (2013.01); *F16C 19/225* (2013.01); *F16C 19/305* (2013.01);
(Continued)

(58) Field of Classification Search
CPC .... F16H 49/001; F16C 19/225; F16C 19/305; F16C 33/4605; F16C 33/467; F16C 19/26
(Continued)

(56) References Cited

U.S. PATENT DOCUMENTS

| 1,917,452 A | * | 7/1933 | Lott | ........................ | F16C 19/26 |
| | | | | | 384/564 |
| 3,230,023 A | * | 1/1966 | Dahl | ..................... | F16C 33/605 |
| | | | | | 384/570 |

(Continued)

FOREIGN PATENT DOCUMENTS

| JP | 48-21046 U | 3/1973 |
| JP | 1-119959 U | 8/1989 |

(Continued)

OTHER PUBLICATIONS

International Search Report (PCT/ISA/210) dated Feb. 10, 2015, by the Japanese Patent Office as the International Searching Authority for International Application No. PCT/JP2015/050359.
(Continued)

*Primary Examiner* — William C Joyce
(74) *Attorney, Agent, or Firm* — Buchanan Ingersoll & Rooney PC

(57) ABSTRACT

A strain wave gearing has a wave generator provided with a plug and a roller bearing. The roller bearing is provided with flange plates fixed to both sides of the plug, and outer circumferential edge portions of the flange plates protrude outwardly from a plug outer circumferential surface so as to locate on both sides, in an axial line direction, of the raceway of rollers. The movements of the rollers in the axial line direction are constrained by the outer circumferential edge portions. The movement of retainer in the axial line direction is constrained by engaging with the rollers. The movement of each component part of the roller bearing in the axial line direction can be constrained without using additional components.

8 Claims, 7 Drawing Sheets

(51) Int. Cl.
 F16C 33/46 (2006.01)
 F16C 19/22 (2006.01)
 F16C 19/30 (2006.01)
 F16C 19/26 (2006.01)
(52) U.S. Cl.
 CPC ........ *F16C 33/4605* (2013.01); *F16C 33/467* (2013.01); *F16C 19/26* (2013.01)
(58) Field of Classification Search
 USPC ............................ 74/640; 384/564, 569, 570
 See application file for complete search history.

(56) References Cited

U.S. PATENT DOCUMENTS

| | | | | |
|---|---|---|---|---|
| 4,715,247 | A * | 12/1987 | Honda | F16H 49/001 384/523 |
| 9,011,018 | B2 * | 4/2015 | Toda | F16C 19/36 384/450 |
| 9,145,919 | B2 * | 9/2015 | Lee | F16C 33/581 |
| 9,435,418 | B2 * | 9/2016 | Hoshina | F16C 19/44 |
| 2016/0025203 | A1 | 1/2016 | Hoshina et al. | |
| 2016/0047451 | A1 | 2/2016 | Hoshina et al. | |

FOREIGN PATENT DOCUMENTS

| | | | |
|---|---|---|---|
| JP | 2002-195272 | * | 7/2002 |
| JP | 2007-10012 | A | 1/2007 |
| JP | 2007-239834 | A | 9/2007 |
| JP | 2008-164149 | A | 7/2008 |
| JP | 2011-190826 | A | 9/2011 |
| JP | 2013-15191 | A | 1/2013 |
| JP | 2014-81017 | A | 5/2014 |
| JP | 2014-92208 | A | 5/2014 |
| WO | WO 2014/181375 | A1 | 11/2014 |
| WO | WO 2014/181376 | A1 | 11/2014 |

OTHER PUBLICATIONS

Written Opinion (PCT/ISA/237) dated Feb. 10, 2015, by the Japanese Patent Office as the International Searching Authority for International Application No. PCT/JP2015/050359.

* cited by examiner

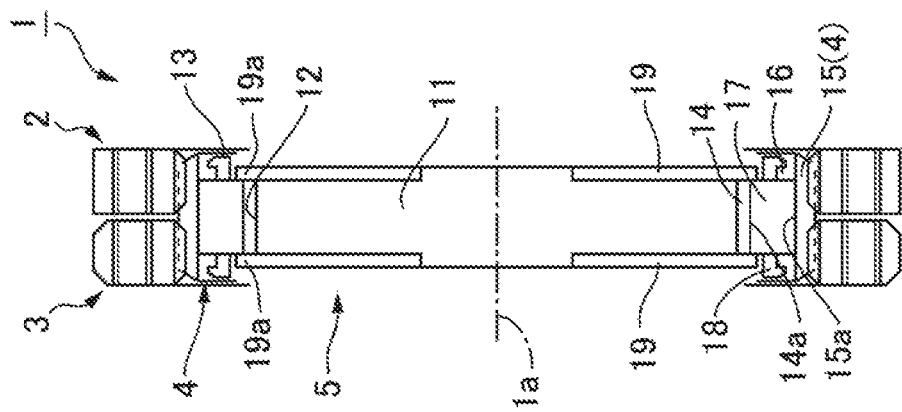
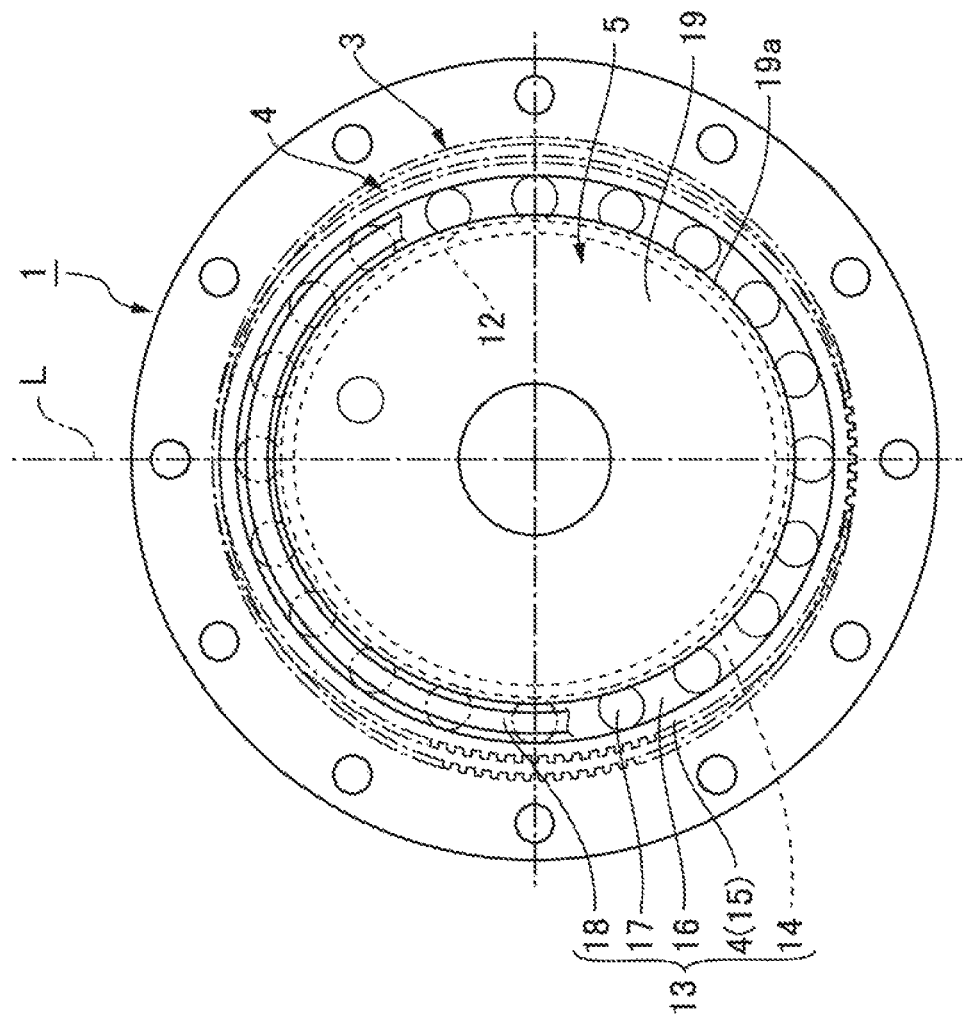

(Modified Example A)

(Modified Example B)

(Modified Example C)

(Modified Example D)

(Modified Example E)

WAVE GENERATOR AND STRAIN WAVE GEARING

TECHNICAL FIELD

The present invention relates to a wave generator of a strain wave gearing, and, in particular, to a wave generator provided with a roller bearing.

BACKGROUND ART

A strain wave gearing has a wave generator provided with a rigid plug and a wave bearing fitted on an elliptical outer circumferential surface of the plug. There are cases in which a roller bearing is used as the wave gearing. A roller bearing is constituted by an inner ring, an outer ring, a plurality of rollers accommodated between the rings, and a retainer having pockets for holding the respective rollers at constant intervals. Patent documents 1 and 2 propose strain wave gearings having a wave generator provided with a roller bearing.

PRIOR ART DOCUMENT

Patent Document

Patent document 1: JP 2011-190826 A
Patent document 2: JP 2014-81017 A

SUMMARY OF THE INVENTION

Means of Solving the Problems

Here, a force in an axial line direction called as a thrust force is generated in the wave generator of a strain wave gearing during operation. The thrust force is generated only during operation of the strain wave gearing. The thrust force is generated in a direction from an input side toward an output side in a speed-reduction operation, and in a direction from the output side toward the input side in a speed-increase operation.

However, a wave generator using a roller bearing is not provided therein with a mechanism for constraining the movement of each component part of the roller bearing in the axial line direction caused by the thrust force. Thus, it is necessary to attach additional components to constrain the movement of each component part of the roller bearing in the axial line direction.

For example, the roller bearing of the wave generator disclosed in Patent document 1 is a full-roller-type roller bearing, and is provided with an inner ring integrally formed in a plug and rollers accommodated between the inner ring and an outer ring. The movement of each roller in the axial line direction is constrained by support flanges screwed into the both sides of the plug. However, the movement of the outer race in the axial line direction cannot be controlled.

On the other hand, two rows of roller bearings are arranged in the wave generator disclosed in Patent document 2. The movements of component parts of these roller bearings in the axial line direction can be controlled in a direction in which the component parts come close to each other, but cannot be controlled in a direction in which the component parts become apart from each other.

In view of the above points, an object of the present invention is to provide a wave generator which is capable of controlling the movement in the axial line direction of each component part of a roller bearing of the wave generator without requiring external components, and to provide a strain wave gearing provided with the wave generator.

Problems to be Solved by the Invention

In order to solve the above problems, the present invention is directed to a wave generator of a strain wave gearing in which the wave generator flexes a flexible externally toothed gear elliptically so as to partially mesh with a rigid internally toothed gear, and moves meshing positions between the both gears in a circumferential direction, the wave generator is characterized by having:

rigid plug, and a roller bearing that is fitted on an elliptical plug outer circumferential surface of the plug and is flexed elliptically, wherein the roller bearing is provided with an inner ring, an outer ring, a plurality of rollers accommodated in a raceway between the inner ring and the outer ring, a retainer for holding the rollers in the raceway at prescribed intervals in a circumferential direction, and flange plates fixed to or integrally formed in respective side portions of the plug at both sides in a axial line direction, wherein the flange plates are respectively provided with outer circumferential edge portions that protrude outward from the plug outer circumferential surface so as to position at both sides in the axial line direction of the raceway, wherein the rollers are arranged so that, when moved in the axial line direction, they come in engagement with the outer circumferential edge portions of the respective flange plates, and movements thereof in the axial line direction are constrained, and wherein the retainer is arranged so that, when moved in the axial line direction, it comes in engagement with the outer circumferential edge portions of the respective flange plates, and a movement thereof in the axial line direction is constrained.

According to the present invention, the movement of each roller in the axial line direction is constrained by the flange plates that are fixed to or integrally formed in the side parts on both sides of the plug, and the movement of the retainer in the axial line direction is constrained by the rollers that are under constraint not to move in the axial line direction. Hence, it is not necessary to provide additional parts to constrain the movements of these component parts in the axial line direction.

When the outer ring of the roller bearing is integrally formed in the externally toothed gear, a component is not required so as to constrain the movement of the outer ring in the axial line direction. When the outer ring is not integrally formed in the externally toothed gear, the movement of the outer ring in the axial line direction may be constrained by using the retainer, the movement of the retainer in the axial line direction being constrained as mentioned above.

Specifically, the retainer may be formed with annular outer-circumferential-side engaging projections that protrude outward from the both end parts of the retainer so as to face the both sides of the outer ring, whereby, when the outer ring moves in the axial line direction, it comes in engagement with either one of the outer-circumferential-side engaging projections, and the movement thereof in the axial line direction is constrained.

In this case, it is also possible to provide annular inner-circumferential-side engaging projections that protrude inward from the both end parts of the retainer so as to face the outer circumferential edge portions of the flange plates from both sides in the axial line direction, whereby the movement of the retainer in the axial line direction is constrained by the outer circumferential edge portions of the flange plates.

On the other hand, the movements of the roller and the outer ring in the axial line direction may be constrained by using the outer circumferential edge portions of the flange plates instead of using the retainer.

Specifically, the outer circumferential edge portions of the flange plates may be made to face the retainer and the outer race respectively from both sides in the axial line direction, whereby, the outer ring, when moved in the axial line direction, comes in engagement with either one of the outer circumferential edge portions, and the movements of the roller and the outer ring in the axial line direction are constrained.

Next, it is desirable that the outline shape of the outer circumferential edge portions of the flange plates be a perfect circle or an ellipse, and that the projecting height of the outer circumferential edge portions, which is measured from the elliptical inner-ring-side raceway surface defining the raceway of the rollers, be a dimension in the range of 15% to 40% of the roller diameter.

By setting the projecting height to be equal to or more than 15% of the roller diameter, the outer circumferential edge portion can surely be engaged with the round-shaped end face of the roller, and the roller is prevented from running over the outer circumferential edge portion even if the roller is skewed and inclined with respect to the axial line direction. This can make sure to constrain the movement of the roller in the axial line direction. While, by limiting the projecting height to be equal to or less than 40% of the roller diameter, it is possible to avoid interference between the outer circumferential edge portion and the retainer, and to maintain ease of assembling work of the roller bearing such as roller-insertion operation.

Next, a strain wave gearing of the present invention is characterized by having a rigid internally toothed gear, a flexible externally toothed gear, and the wave generator of the above-described constitution.

It is not necessary to arrange additional components in order to constrain the movements in the axial line direction of the component parts of the wave bearing in the wave generator. Accordingly, it is advantageous for the strain wave gearing to make small and compact.

BRIEF DESCRIPTION OF THE DRAWINGS

FIGS. 1(a) and 1(b) include a schematic front view and a schematic longitudinal sectional view of a strain wave gearing according to an embodiment of the present invention;

MODE FOR CARRYING OUT THE INVENTION

Figure 2A:
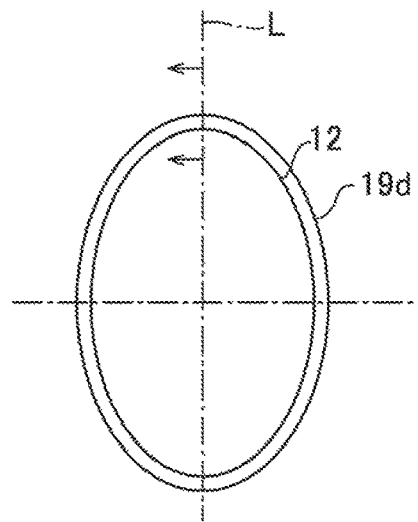
FIGS. 2(a) to 2(d) include explanatory views showing two examples of outline shapes of a flange plate, and an explanatory view showing the outer circumferential edge portion of the flange plate.
Figure 2C:
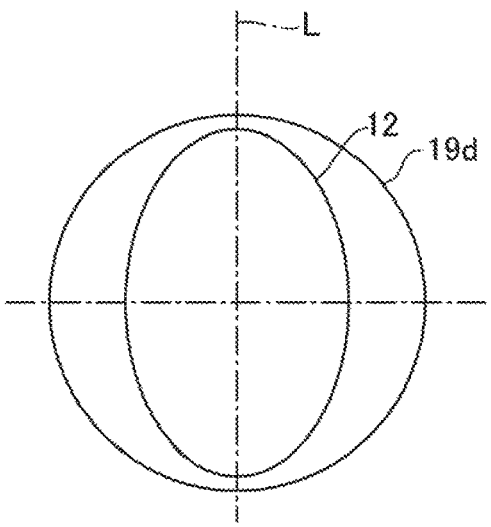
Figure 2B:
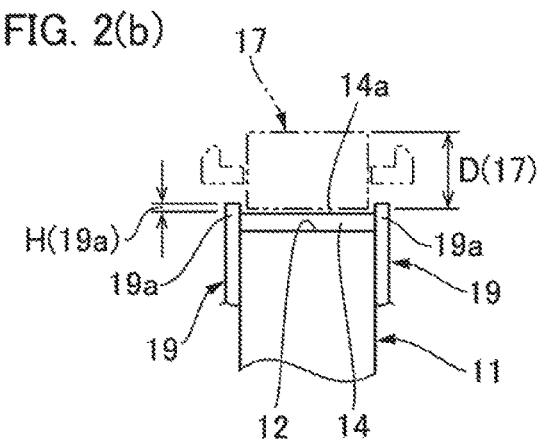
Figure 2D:
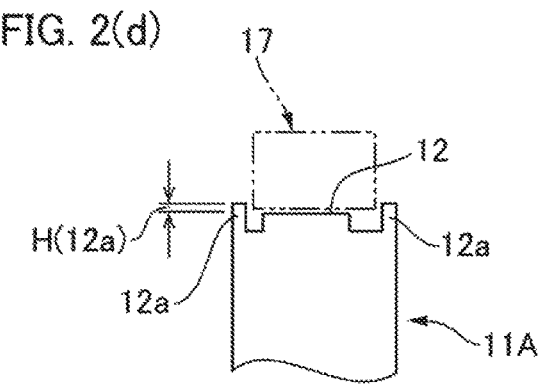

Embodiments of a strain wave gearing according to the present invention will be described hereinafter with reference to the drawings.

FIG. 1 includes a schematic front view and a schematic longitudinal sectional view showing an embodiment of a strain wave gearing according to the present invention. A strain wave gearing 1 is a strain wave gearing called as a flat type, and is provided with two rigid internally toothed gears 2 and 3, a cylindrical flexible externally toothed gear 4, and a wave generator 5 having an elliptical profile.

The internally toothed gears 2 and 3 are coaxially arranged in parallel. When used as a speed reduction device, one internally toothed gear 2 is set to be a stationary-side internally toothed gear fixed so as not to rotate, and the other internally toothed gear 3 is set to be a drive-side internally toothed gear for outputting a reduced-speed rotation.

The externally toothed gear 4 is meshable with both internally toothed gears 2 and 3, and is arranged coaxially inside these internally toothed gears 2 and 3. The wave generator 5 is fitted inside the externally toothed gear 4, and makes the externally toothed gear 4 to flex into an elliptical shape to mesh with the both internally toothed gears 2 and 3 at both end positions on the major axis L of the elliptical shape.

The drive-side internally toothed gear 3 and the externally toothed gear 4 have the same number of teeth, and the stationary-side internally toothed gear 2 has the number of teeth which is greater by 2n (n is a positive integer) than the number of teeth of these gears. When the wave generator 5 rotates once, the externally toothed gear 4 is caused to rotate relative to the stationary-side internally toothed gear 2 by an angle corresponding to the difference in number of teeth. The externally toothed gear 4 rotates integrally with the internally toothed gear 3, and a reduced-speed rotation is derived to the side of a driven member from the internally toothed gear 3.

The wave generator 5 is provided with a rigid plug 11, and a roller bearing 13 which is fitted on an elliptical plug outer circumferential surface 12 of the plug 11 and is flexed into an elliptical shape. The roller bearing 13 is provided with an inner ring 14, an outer ring 15 integrally formed in the externally toothed gear 4, a plurality of rollers 17 rollably accommodated in a raceway 16 between the rings, and a cylindrical retainer 18 having a plurality of pockets for holding the rollers 17 in the raceway 16 at a constant interval along a circumferential direction.

In the present example, since the outer ring 15 is integrally formed in the externally toothed gear 4, an outer-ring-side raceway surface 15a is formed on the inner circumferential surface of the externally toothed gear 4. The rollers 17 are accommodated in a rotatable manner in the raceway 16 formed between the outer-ring-side raceway surface 15a and an inner-ring-side raceway surface 14a formed on the outer circumferential surface of the inner ring 14. The number of rollers 17 is set to be in a range of 11 to 23. It is generally undesirable when the number is fewer than the range, because vibration and angle transmission error become large. It is not preferable when the number is greater than the range, because the interval between the pockets in the circumferential direction of the retainer 18 becomes narrow, making partition walls partitioning adjacent pockets to become thin and to decrease in strength thereof. In addition, it is not preferable because the roller diameter becomes small, and the design and assembly of the retainer becomes difficult.

The roller bearing 13 is also provided with two flange plates 19 which are respectively fixed to the side parts on both sides of the plug 11 in the axial line direction 1a. The flange plates 19 have an elliptical profile which is one-size larger than the plug outer circumferential surface 12. Specifically, the flange plates 19 respectively have outer circumferential edge portions 19a which protrude outward from the plug outer circumferential surface 12 so as to face the inner ring 14 and the raceway 16 from both sides in the axial line direction 1a. The flange plates 19 may have a circular profile.

Here, FIG. 2 (a) is a schematic view showing the profile shape of the plug outer circumferential surface 12 and the profile shape 19d of the flange plate 19, and FIG. 2 (b) is an explanatory view showing the projecting height of the outer circumferential edge portion 19a of the flange plate 19. In these drawings, the ellipticity of the plug outer circumferential surface 12 is shown in an exaggerated manner. The outer circumferential edge portion 19a has the projecting height H(19a) measured from the inner-ring-side raceway surface 14a of an elliptical shape, the projecting height being set to have a dimension between 15% and 40% of the diameter D(17) of the roller 17 at the major-axis position of the elliptical shape.

while, FIG. 2 (c) shows a case in which the flange plate 19 has a circular profile. In this case as well, the projecting height H (19a) of the outer circumferential edge portion 19a is set to be a dimension between 15% and 40% of the diameter D(17) of the roller 17 at the major-axis position of the elliptical inner-ring-side raceway surface 14a. In addition, as shown in FIG. 2(d), the inner ring 14 is integrally formed in the plug 11 such as in the case of a modified example A to be described hereinafter (see FIG. 3). In this case, projecting parts 12a are formed on both ends of the plug outer circumferential surface 12, the projecting height H(12a) of the projection parts 12a being set to be a dimension between 15% and 40% of the diameter D(17) of the roller 17.

In the thus constituted wave generator 5 of the strain wave gearing 1, a thrust force is applied to the roller bearing 13 during operation. When the roller 17 is going to move in the axial line direction 1a by the thrust force, the end faces of the roller 17 on both sides abut against the outer circumferential edge portions 19a of the flange plate 19. With this, the movement of the roller 17 in the axial line direction 1a is constrained or limited. The rollers 17 are inserted into the respective pockets formed in the retainer 18 in a free rolling state. Accordingly, when the retainer 18 is going to move in the axial line direction 1a, the movement of the retainer 18 is also constrained or limited by the rollers 17 which are in a state in which the movement thereof is constrained or restricted.

Thus, without arranging additional components, only the component parts of the roller bearing 13 of the wave generator 5 are used to constitute a mechanism for constraining or limiting the movements of the respective component parts in the axial line direction 1a.

Modified Example A

Figure 3:
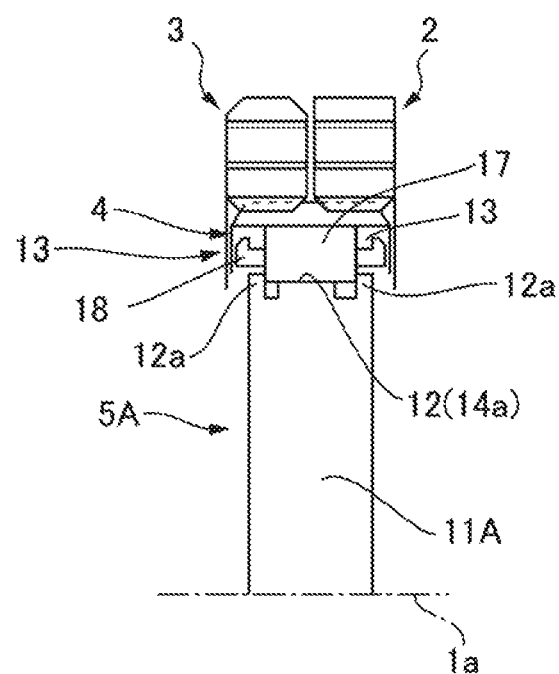
FIG. 3 is a schematic semi-longitudinal sectional view showing a modified example A of a wave generator.

FIG. 3 is a schematic semi-longitudinal sectional view showing a modified example A of the wave generator 5. In the wave generator 5A shown in this drawing, the roller bearing 13 has an inner ring integrally formed in the plug 11A. Therefore, the inner-ring-side raceway surface 14a is formed on the plug outer circumferential surface 12. In addition, the left and right flange plates 19 in the above wave generator 5 are also integrally formed in the plug 11A. The portions corresponding to the outer circumferential edge portions 19a of the flange plates 19 are two projecting parts 12a of a rectangular section, the projecting parts being formed by protruding outward the both end parts in the axial line direction 1a of the plug outer circumferential surface 12 with a constant width. The other constitutions are the same as those of the embodiment of FIG. 1, and the explanation thereof is omitted.

Modified Example B

Figure 4:
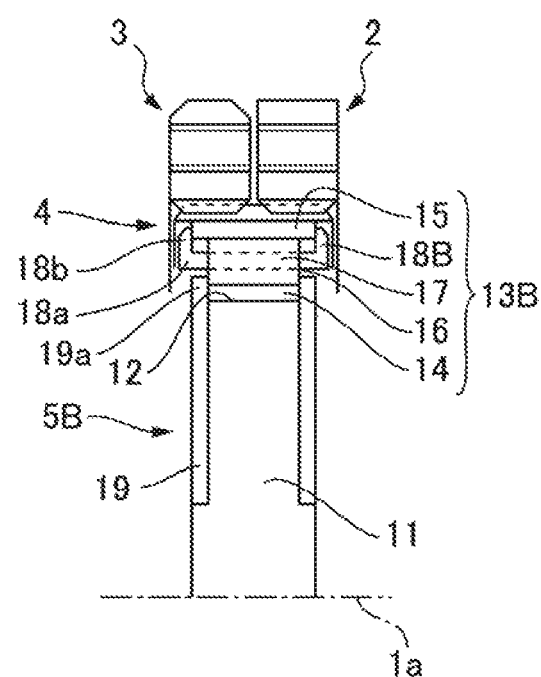
FIG. 4 is a schematic semi-longitudinal sectional view showing a modified example B of a wave generator.

FIG. 4 is a schematic semi-longitudinal sectional view showing a modified example B of the wave generator 5. A roller bearing 13B of a wave generator 5B is provided with an inner ring 14, an outer ring 15, rollers 17, a retainer 18B, and flange plates 19. The retainer 18B is provided with a cylindrical part 18a formed with pockets. The cylindrical part 18a has both end parts in the axial line direction 1a, where annular outer-circumferential-side engaging projecting parts 18b are formed so that they protrude outward to face the end faces on both sides of the outer ring 15. The other constitutions are the same as those of the embodiment of FIG. 1, and the explanation thereof is omitted.

The roller 17 is sandwiched from the both sides in the axial line direction 1a by the outer circumferential edge portions 19a of the left and right flange plates 19, whereby the movement thereof in the axial line direction 1a is constrained or limited. Therefore, the movement in the axial line direction 1a of the retainer 18B, in which the rollers 17 are respectively inserted into the pockets, is also constrained or limited. In addition, the outer ring 15 are sandwiched in the axial line direction 1a by the left and right outer-circumferential-side engaging projecting parts 18b. Accordingly, the movement of the outer ring 15 in the axial line direction 1a is constrained or limited by the retainer 18B.

Modified Example C

Figure 5:
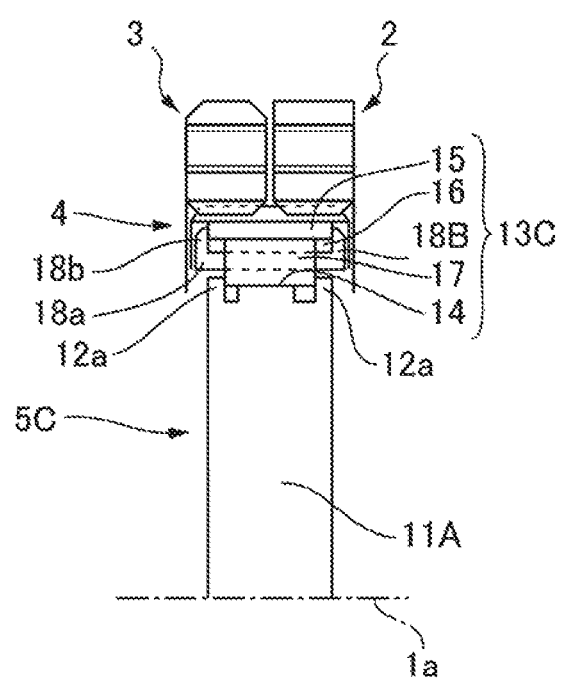
FIG. 5 is a schematic semi-longitudinal sectional view showing a modified example C of a wave generator.

FIG. 5 is a schematic semi-longitudinal sectional view showing a modified example C of the wave generator 5. A roller bearing 13C of a wave generator 5C is constituted so that the inner ring of the roller bearing 13B of the wave generator 5B of the modified example B shown in FIG. 4 is integrally formed in the plug 11A. Therefore, an inner-ring-side raceway surface 14a is formed on the plug outer circumferential surface 12. In addition, the left and right flange plates are also integrally formed in the plug 11A. The outer circumferential edge portions of the flange plates correspond to two projecting parts 12a of a rectangular section, the projecting parts being formed by protruding outward the end parts on both sides of the plug outer circumferential surface 12 with a constant width. The other constitutions are the same as those of the wave generator 5B shown in FIG. 4, and the explanation thereof is omitted.

Modified Example D

Figure 6:
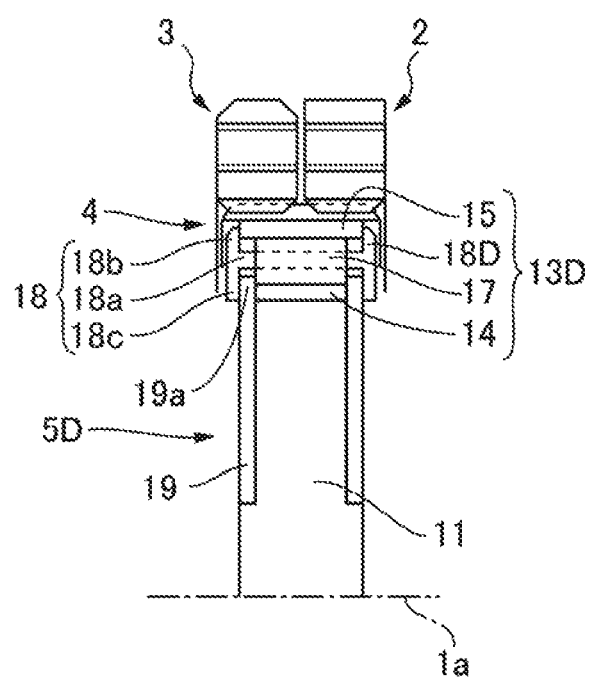
FIG. 6 is a schematic semi-longitudinal sectional view showing a modified example D of a wave generator.

FIG. 6 is a schematic semi-longitudinal sectional view showing a modified example D of the wave generator 5. A wave generator 5D shown in this drawing has a roller bearing 13D provided with a retainer 18D. The retainer is constituted so that, in the retainer 18B of the wave generator 5B of the modified example B (see FIG. 4), annular inner-circumferential-side engaging projecting parts 18c are added to the both end parts in the axial line direction 1a of the cylindrical part 18a, the inner-circumferential-side engaging projections 18c protruding inward so as to face the respective outer circumferential edge portions 19a of the flange plates 19 from both sides in the axial line direction 1a. The other constitutions are the same as those of the wave generator 5B of the modified example B, and the explanation thereof is omitted.

The inner ring 13 and the rollers 17 are sandwiched from both sides in the axial line direction 1a between the outer circumferential edge portions 19a of the left and right flange plates 19, and the movements thereof in the axial line direction 1a are constrained or limited. Therefore, the movement in the axial line direction 1a of the retainer 18D, in which the rollers 17 are respectively inserted into pockets of the retainer, is also constrained or limited. In addition, the outer ring 15 is sandwiched between the left and right outer-circumferential-side engaging projecting parts 18b of the retainer 18D. Accordingly, the movement of the outer ring 15 in the axial line direction 1a is constrained or limited. In addition, the movement of the retainer 18D in the axial line direction 1a is also constrained or limited by engaging the left and right inner-circumferential-side engaging projecting parts 18c with the outer circumferential edge portions 19a of the left and right flange plates 19.

Modified Example E

Figure 7:
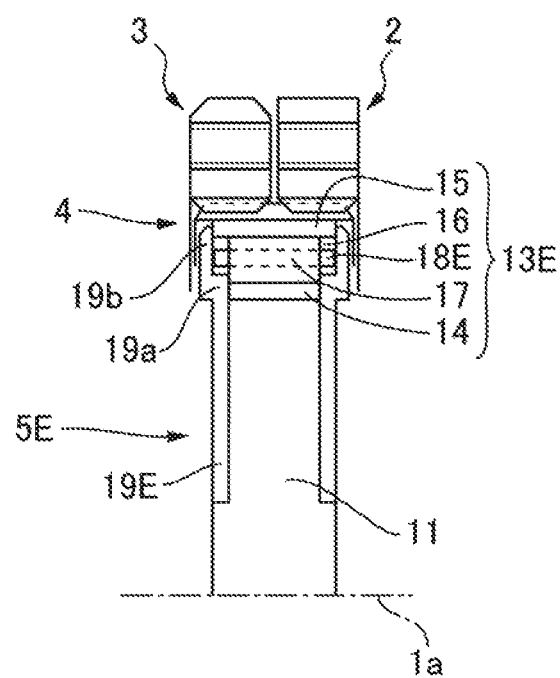
FIG. 7 is a schematic semi-longitudinal sectional view showing a modified example E of a wave generator.

FIG. 7 is a schematic semi-longitudinal sectional view showing a modified example E of the wave generator 5. A wave generator 5E shown in this drawing, is provided with an inner ring 14, an outer ring 15, rollers 17, a retainer 18, and flange plates 19. Outer circumferential edge portions 19a of the left and right flange plates 19E are provided with extended portions 19b that are bent perpendicularly to outside from portions opposed to the end faces of the inner rings 14 on both sides, and are then protruded outward. The left and right extended portions 19b are opposed to the retainer 18E and the outer ring 15 from both sides in the axial line direction 1a.

The inner ring 14 and the rollers 17 are sandwiched from both sides in the axial line direction 1a between the outer circumferential edge portions 19a of the left and right flange plates 19, and the movements thereof in the axial line direction 1a are constrained or limited. Therefore, the movement in the axial line direction 1a of the retainer 18E, in which the rollers 17 are respectively inserted into pockets, is also constrained or limited. In addition, the outer ring 15 is sandwiched in the axial line direction 1a between the extended portions 19b extending outward from the outer circumferential edge portions 19a of the left and right flange plates 19. Accordingly, the movement in the axial line direction 1a of the outer ring 15 is constrained or limited by the left and right flange plates 19. In addition, the movement in the axial line direction 1a of the retainer 18E is constrained by the extended portions 19b of the left and right flange plates 19.

Another Embodiments

The above-described embodiments are related to a flat-type strain wave gearing provided with a cylindrical externally toothed gear. The present invention can also be applied to a cup-type strain wave gearing provided with a cup-shaped externally toothed gear and a silk-hat-type strain wave gearing provided with a silk-hat-shaped externally toothed gear in a similar manner.

The invention claimed is:

1. A wave generator of a strain wave gearing for flexing a flexible externally toothed gear elliptically to partially mesh with a rigid internally toothed gear and to move meshing portions of the gears in a circumferential direction, the wave generator comprising:
   a rigid plug, and a roller bearing that is fitted on an elliptical plug outer circumferential surface of the plug and is flexed elliptically,
   wherein the roller bearing has an inner ring, an outer ring, a plurality of rollers accommodated rollably in a raceway between the inner ring and the outer ring, a retainer for holding the rollers in the raceway at prescribed intervals in a circumferential direction, and flange plates fixed to or integrally formed in side parts on both sides of the plug in an axial line direction;
   each of the flange plates has an outer circumferential edge portion protruding outward from the plug outer circumferential surface and is located on both sides of the raceway in the axial line direction of the raceway;
   the rollers are arranged so that, when the rollers move in the axial line direction, the rollers come in engagement with the respective outer circumferential edge portions and movements of the rollers in the axial line direction are constrained;
   the retainer is arranged so that, when the retainer moves in the axial line direction, the retainer comes in engagement with the rollers and a movement of the retainer in the axial line direction is constrained;
   a profile shape of the outer circumferential edge portions of the flange plates is a circle or an ellipse; and
   the outer circumferential edge portions have a projecting height measured from an elliptical inner-ring-side raceway surface of the raceway, the projecting height having a dimension in a range of 15% to 40% of a diameter of the roller at a major-axis position of the elliptical inner-ring-side raceway surface;
   wherein the retainer is formed with annular outer-circumferential-side engaging projecting parts that protrude outward from both end parts, in the axial line direction, of the retainer so as to face both sides of the outer ring; and
   when the outer ring moves in the axial line direction, the outer ring comes in engagement with the outer-circumferential-side engaging projecting parts, and a movement of the outer ring in the axial line direction is constrained.

2. The wave generator of the strain wave gearing according to claim 1, wherein the outer ring is integrally formed in the externally toothed gear.

3. The wave generator of the strain wave gearing according to claim 1,
   wherein the retainer has annular inner-circumferential-side engaging projecting parts that protrude inward from both end parts, in the axial line direction, of the retainer so as to face the outer circumferential edge portions of the flange plates from both sides in the axial line direction.

4. The wave generator of the strain wave gearing according to claim 1, wherein a number of the rollers is 11 to 23.

5. A strain wave gearing comprising:
   a rigid internally toothed gear, a flexible externally toothed gear, and a wave generator fitted inside the externally toothed gear, the wave generator flexing the externally toothed gear elliptically to partially mesh with the internally toothed gear and moving meshing portions of the both gears in a circumferential direction, wherein the wave generator is the wave generator as set forth in claim 1.

6. The wave generator of the strain wave gearing according to claim 1, wherein the profile shape of the outer circumferential edge portions of the flange plates is a circle.

7. The wave generator of the strain wave gearing according to claim 1, wherein the profile shape of the outer circumferential edge portions of the flange plates is an ellipse.

8. A wave generator, of a strain wave gearing for flexing a flexible externally toothed gear elliptically to partially mesh with a rigid internally toothed gear and to move meshing portions of the gears in a circumferential direction, the wave generator comprising:

a rigid plug, and a roller bearing that is fitted on an elliptical plug outer circumferential surface of the plug and is flexed elliptically, wherein the roller bearing has an inner ring, an outer ring, a plurality of rollers accommodated rollably in a raceway between the inner ring and the outer ring, a retainer for holding the rollers in the raceway at prescribed intervals in a circumferential direction, and flange plates fixed to or integrally formed in side parts on both sides of the plug in an axial line direction;

each of the flange plates has an outer circumferential edge portion protruding outward from the plug outer circumferential surface and is located on both sides of the raceway in the axial line direction of the raceway;

the rollers are arranged so that, when the rollers move in the axial line direction, the rollers come in engagement with the respective outer circumferential edge portions and movements of the rollers in the axial line direction are constrained;

the retainer is arranged so that, when the retainer moves in the axial line direction, the retainer comes in engagement with the rollers and a movement of the retainer in the axial line direction is constrained;

a profile shape of the outer circumferential edge portions of the flange plates is a circle or an ellipse; and the outer circumferential edge portions have a projecting height measured from an elliptical inner-ring-side raceway surface of the raceway, the projecting height having a dimension in a range of 15% to 40% of a diameter of the roller at a major-axis position of the elliptical inner-ring-side raceway surface;

wherein the outer circumferential edge portions of the flange plates face the retainer and the outer ring from both sides in the axial line direction; and when the outer ring moves in the axial line direction, the outer ring comes in engagement with the outer circumferential edge portions and a movement of the outer ring in the axial line direction is constrained.

* * * * *